(12) United States Patent
Kawasaki (10) Patent No.: US 6,655,624 B2
(45) Date of Patent: Dec. 2, 2003

(54) CARTRIDGE ENGAGING MECHANISM

(75) Inventor: Toshimitsu Kawasaki, Yonezawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/183,645

(22) Filed: Jun. 28, 2002

(65) Prior Publication Data

US 2003/0001039 A1 Jan. 2, 2003

(30) Foreign Application Priority Data

Jun. 29, 2001 (JP) ........................................ 2001-198937

(51) Int. Cl.$^7$ .............................................. G11B 23/07
(52) U.S. Cl. ...................... 242/342; 242/348; 360/96.3
(58) Field of Search ................................. 242/348, 349, 242/352.3, 61, 338.11, 340, 342; 360/96.3, 132

(56) References Cited

U.S. PATENT DOCUMENTS

| | | | |
|---|---|---|---|
| 5,752,669 A | * | 5/1998 | Yeakley ........................ 242/340 |
| 6,273,352 B1 | * | 8/2001 | Johnson et al. ............... 242/340 |
| 6,491,247 B2 | * | 12/2002 | Huettenegger ............... 242/342 |
| 6,499,686 B2 | * | 12/2002 | Tsuyuki et al. ............... 242/348 |

FOREIGN PATENT DOCUMENTS

| | | |
|---|---|---|
| JP | 04-069845 | 3/1992 |
| JP | 06-349151 | 12/1994 |
| JP | 07-244955 | 9/1995 |
| JP | 11-317049 | 11/1999 |

* cited by examiner

Primary Examiner—William A. Rivera
(74) Attorney, Agent, or Firm—Young & Thompson

(57) ABSTRACT

A cartridge gear having an annular shape around its rotational center and secured to a reel of a tape cartridge loaded in a drive device has a tapered shape having a first inclination angle which is lower in height as the tooth tops thereof approach the innermost peripheral edge. A drive gear having an annular shape around its rotational center and connected to a reel motor of the drive device has a tapered shape having a second inclination angle which is lower in height as the tooth tops thereof approach the outermost peripheral edge, the second angle being smaller than the first angle. The tapered shape of the drive gear is formed in an area which extends outwardly from the radially-innermost position of the drive gear where lock pads abut against the drive gear when the drive gear and the cartridge gear are in proper engagement with each other.

11 Claims, 9 Drawing Sheets

PORTION "B"

PORTION "A"

CARTRIDGE ENGAGING MECHANISM

BACKGROUND OF THE INVENTION

1. Field of the Invention

The present invention relates to a cartridge engaging mechanism for the engagement between a tape cartridge and a tape drive device when the tape cartridge is loaded into the tape drive device.

2. Description of the Related Art

A single reel cartridge magnetic tape is used as one of storage media for computers. The magnetic tape is wound around a reel while one end thereof is fixed to the core of the reel, and the reel is supported in a case of a cartridge so as to be rotatable relatively to the case. The other end of the magnetic tape is drawn out from the case of the cartridge followed by rotation of the reel.

When the cartridge is loaded in the magnetic tape drive device, the rotational driving force can be transmitted from the driving motor (reel motor) of the drive device to the reel of the cartridge by a cartridge engaging mechanism. In order to construct the cartridge engaging mechanism, a plane-type cartridge gear exposed to the outside from the outer surface of the case is equipped to the reel at the cartridge side, and a plane-type drive gear for receiving the rotational force transmitted from the reel motor is disposed at the drive device side, and the cartridge gear and the drive gear are disposed so as to come into contact with each other and separate from each other.

The cartridge is equipped with a reel lock mechanism for preventing the reel from being rotated relatively to the case of the cartridge when the cartridge is unloaded from the drive device (that is, the engagement of the cartridge engaging mechanism is canceled). With the reel lock mechanism, the reel can be prevented from being rotated relatively to the case of the cartridge under states other than the loading state of the cartridge in the drive device, thereby preventing rewinding of the magnetic tape and occurrence of slack of the magnetic tape.

The reel lock mechanism is designed so that brake is released only when the cartridge gear is engaged with the drive gear. In order to satisfy this operation, a movable member called as a lock pad which abuts against the gear tooth tops of the drive gear is secured to each portion at which some gear teeth are removed from the cartridge gear. The lock pad is disposed so as to be reciprocatively movable between an advance position at which the lock pad is projected forwardly from the gear surface and a retraction position at which the lock pad is retracted backwardly from the gear surface. The lock pad is forwardly urged to the advance position by a spring. The brake acts at the advance position, and the lock pad is backwardly moved to the retraction position against the urging force of the spring to release the brake. Therefore, the lock pad is required to have a proper reciprocative movement stroke.

Figure 12:
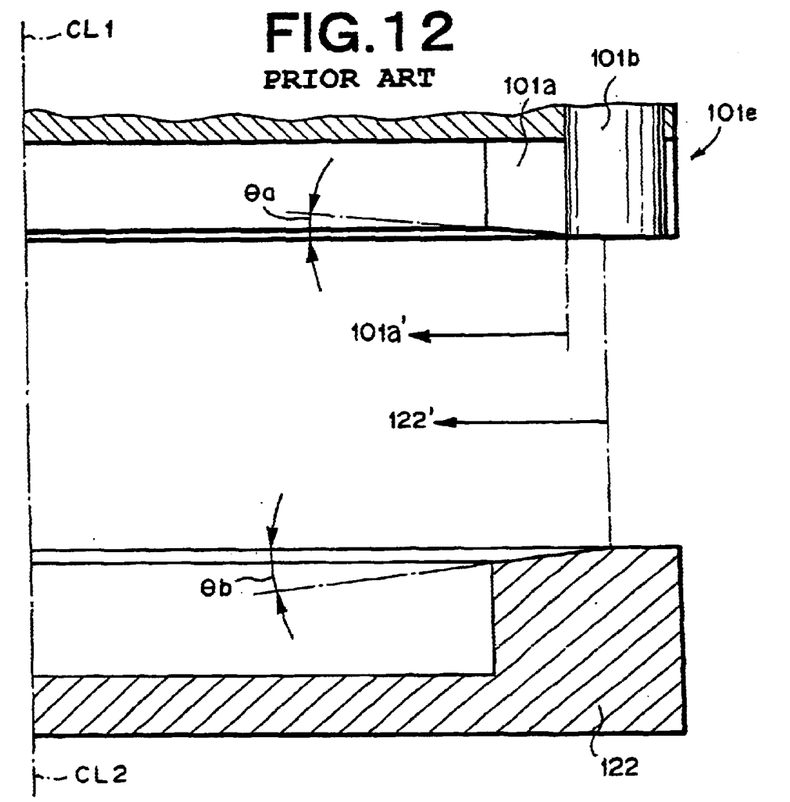
FIG. 12 is a schematic partial cross-sectional view showing a drive gear and a cartridge gear of a conventional cartridge engaging mechanism.

FIG. 12 is a schematically partially cross-sectional view showing the drive gear and the cartridge gear of a conventional cartridge engaging mechanism as described above.

A cartridge gear 101a is designed in an annular form so as to surround the rotational center CL1 extending in the up-and-down direction, and three lock pads 101b are disposed so as to be spaced at an equal angular interval in the circumferential direction of the cartridge gear 110a. Each lock pad 101b is movable in the up-and-down direction over a required stroke with the position shown in FIG. 12 as the lower limit position. A non-tooth portion 101e at which three gear teeth of the cartridge gear 101a are removed is formed in the neighborhood of the formation position of each lock pad 101b. The drive gear 122 has such a shape that it is fit to the cartridge gear 101a, and it is designed in an annular form so as to surround the rotational center CL2 extending in the up-and-down direction.

Each tooth top of the cartridge gear 101a is provided with a tapered portion having a gradually-lowered taper angle of θa in an area extending inwardly from each lock pad 101b, and each tooth top of the drive gear 122 is provided with a tapered portion having a gradually-lowered taper angle of θb in an area extending inwardly from the center of each lock pad 101b as shown in FIG. 12. Accordingly, under the state that the cartridge gear 101a and the drive gear 122 are properly engaged with each other with the rotational centers CL1, CL2 thereof being common to each other, the tooth tops of the drive gear 122 abut against and pushes the lock pads 101b at the highest position of the tooth tops, so that the lock pads 101b can be moved by a distance enough to release the brake.

Figure 13:
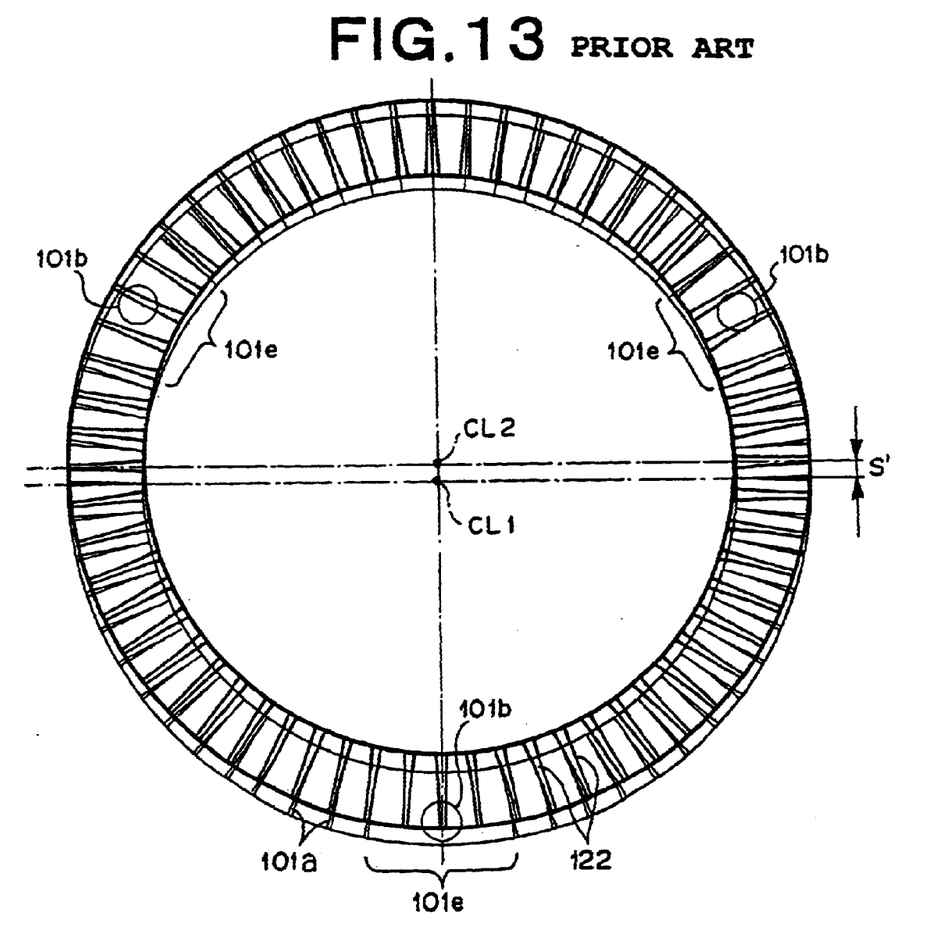
FIG. 13 is a schematic plan view showing a positionally displaced state of the cartridge gear from the drive gear in the conventional cartridge engaging mechanism.

However, if the precision of the positioning of the cartridge case to the drive device when the cartridge is loaded into the drive device and the positional precision of the cartridge gear to the cartridge case are not sufficient, there occurs a positional error between the cartridge gear 101a and the drive gear 122 as shown in FIG. 13. As shown in FIG. 13, there is a case where the positional error described above occurs so that the positional error direction of the cartridge gear 101a with respect to the drive gear 122 is substantially coincident with the direction of the lock pad 101b relative to the rotational center CL1 of the cartridge gear 101a.

Figure 14:
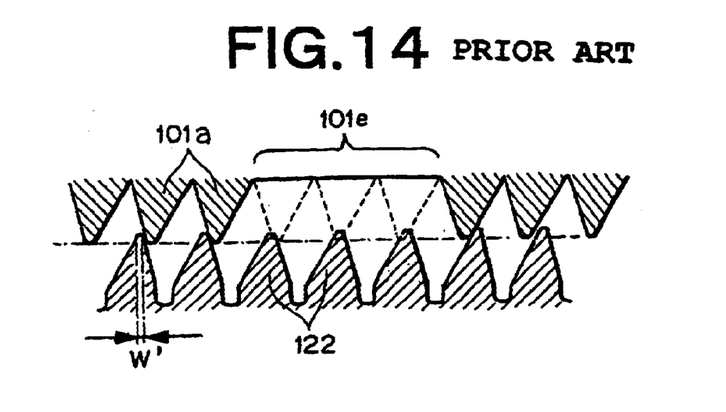
FIG. 14 is a cross-sectional view in the circumferential direction at the outermost peripheral position of the drive gear in the neighborhood of the position corresponding to a lock pad in the conventional cartridge engaging mechanism.

FIG. 14 is a cross-sectional view in the circumferential direction showing the neighborhood of the position corresponding to the lock pads 101b at the outermost peripheral position at which the tooth tops of the drive gear 122 are highest.

As is apparent from FIG. 14, when a slight inclination occurs between the rotational axis direction of the drive gear 122 and the rotational axis direction of the cartridge gear 101a, the tooth tops at both sides of each non-tooth portion 101e intrude in each portion having the largest tooth top pitch in the neighborhood of the outermost peripheral portion of the drive gear 122. Firstly, this is because the tooth top pitch of the cartridge gear 101a is smaller than the tooth top pitch of the drive gear 122 within the cross section shown in FIG. 14, and secondly this is because the tooth tops of the drive gear 122 are formed to be highest in height in order to achieve a required lock pad movement stroke, so that the width W' of the flat portion of each tooth top of the drive gear 122 is small and thus there is little margin in receiving the tooth tops of the cartridge gear 101a by the flat portions of the tooth tops of the drive gear 122. Under such a situation, the relative rotation between both the gears is impossible, and thus it is impossible to properly engage both the gears with each other.

Therefore, in the conventional cartridge engaging mechanism, the permissible dimension for the error or displacement S' between the rotational centers CL1, CL2 of the gears which enables the proper engagement between both the gears is reduced, and thus it is required to enhance the precision of the positioning of the cartridge case to the drive device and also enhance the positional precision of the cartridge reel to the cartridge case. This is an obstacle to reduce the cost of the cartridge engaging mechanism and the cartridge and drive device.

SUMMARY OF THE INVENTION

An object of the present invention is to enhance the tolerance level of the positional error between a cartridge gear and a drive gear to be engaged with each other in a cartridge engaging mechanism.

Another object of the present invention is to enhance the tolerance level of the positional error between a cartridge gear and a drive gear to be engaged with each other in a cartridge engaging mechanism while keeping a required movement stroke of a lock pad of a reel lock mechanism.

In order to attain the above object, according to the present invention, there is provided a cartridge engaging mechanism for engaging a plane-type cartridge gear secured to a reel of a tape cartridge loaded in a tape drive device with a plate-type drive gear connected to a reel motor of the tape drive device, characterized in that the cartridge gear has a tapered shape having a first inclination angle that is lower in height as the tooth tops thereof approach to the innermost peripheral edge, and the drive gear has a tapered shape having a second inclination angle that is lower in height as the tooth tops thereof approach the outermost peripheral edge, the second inclination angle being set to be smaller than the first inclination angle.

In an aspect of the present invention, each of a face of the cartridge gear and a face of the drive gear is formed in an annular shape in a peripheral direction around a rotational center thereof.

In an aspect of the present invention, the cartridge is equipped with a reel lock mechanism for preventing rotation of the reel with respect to a case of the cartridge, and the reel lock mechanism has a lock pad that is reciprocatively movable between an advance position and a retract position at a part of the face of the cartridge gear and urged toward the advance position.

In an aspect of the present invention, the tapered shape of the drive gear is formed in an area which extends outwardly from the radially-innermost position of the drive gear at which the lock pad abuts against the drive gear under the state that the drive gear and the cartridge gear are in proper engagement with each other. In an aspect of the present invention, a width of a flat portion of each of the tooth tops of the drive gear is gradually larger in the outward direction from the radially-innermost position of the drive gear at which the lock pad abuts against the drive gear under the state that the drive gear and the cartridge gear are in proper engagement with each other.

In an aspect of the present invention, the tapered shape of the cartridge gear is formed in an area which extends inwardly from the innermost position of the lock pad in the radial direction of the cartridge gear. In an aspect of the present invention, the cartridge gear has a non-tooth portion having no tooth in an area in the neighborhood of the lock pad.

In an aspect of the present invention, the cartridge engaging mechanism further comprises urging means for urging the cartridge gear toward said drive gear. In an aspect of the present invention, the urging means comprises a magnet equipped to the drive gear and a magnetic member equipped to the cartridge gear.

In an aspect of the present invention, a case of the tape cartridge is equipped with a positioning hole, and the tape drive device is equipped with a support pin which is inserted into the positioning hole when the cartridge gear is engaged with the drive gear to position the case to the tape drive device. In an aspect of the present invention, the support pin has such a sufficient length as to be inserted into the positioning hole before contact between the cartridge gear and the drive gear is started when the cartridge gear is engaged with the drive gear.

According to the present invention, the tolerance level of the positional displacement between the cartridge gear and the drive gear to be engaged with each other in the cartridge engaging mechanism can be enhanced by the specific shape of the teeth of the drive gear, and particularly the tolerance level of the positional displacement between the cartridge gear and the drive gear can be enhanced while keeping the required movement stroke of the lock pads of the reel lock mechanism.

DETAILED DESCRIPTION OF THE PREFERRED EMBODIMENTS

Preferred embodiments according to the present invention will be described hereunder with reference to the accompanying drawings.

Figure 1:
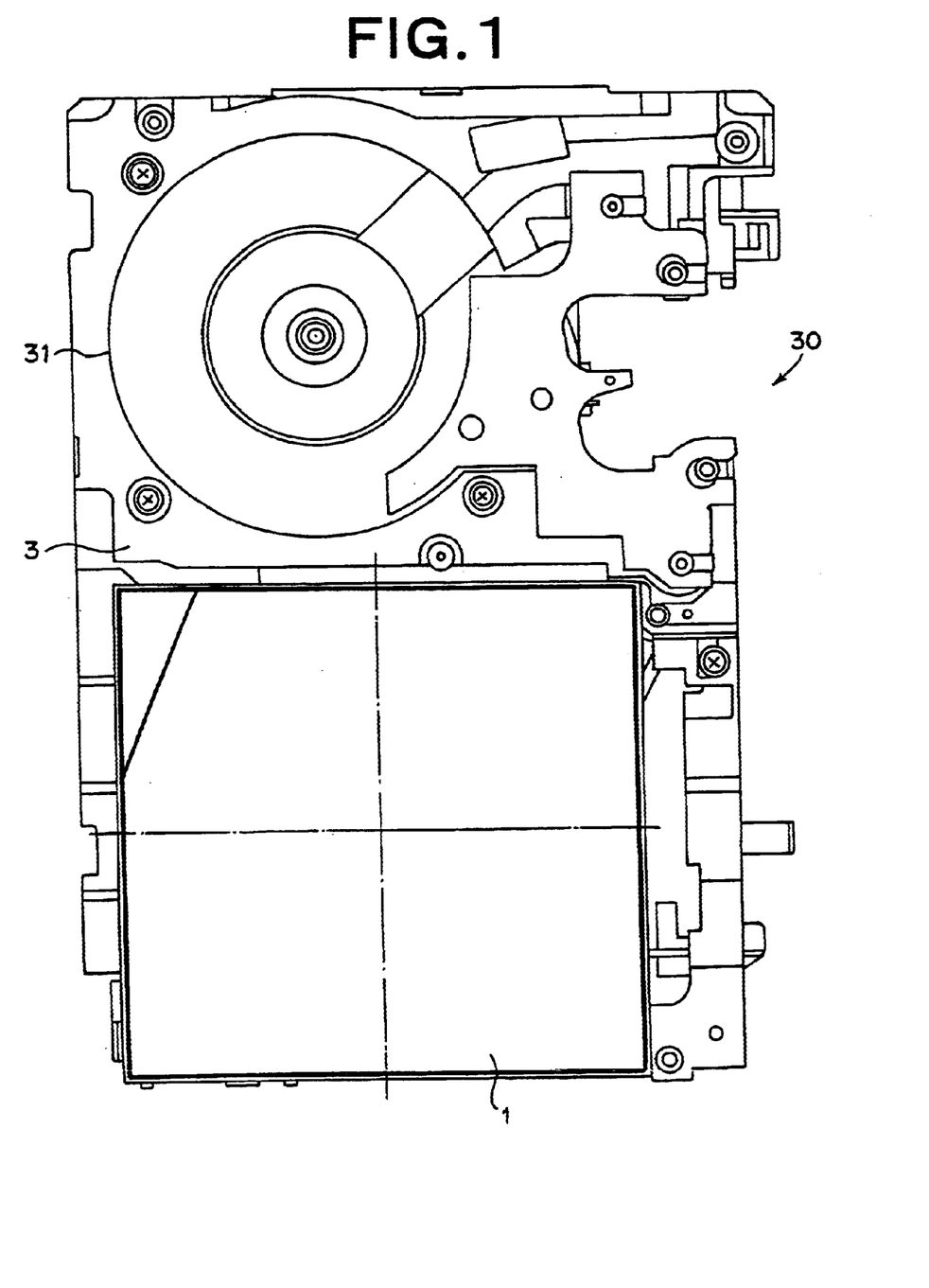
FIG. 1 is a plan view showing a cartridge engaging mechanism according to the present invention.

FIG. 1 is a plan view showing an embodiment of a cartridge engaging mechanism according to the present invention. In FIG. 1 are shown a deck base 3 of a magnetic tape drive device 30 and a cartridge 1 which is loaded at a predetermined position by a loading mechanism (not shown) of the magnetic tape drive device 30. In the drive device 30 is disposed a machine reel 31 for winding up a magnetic tape which is rewound and reeled out from the cartridge 1 thus loaded.

Figure 2:
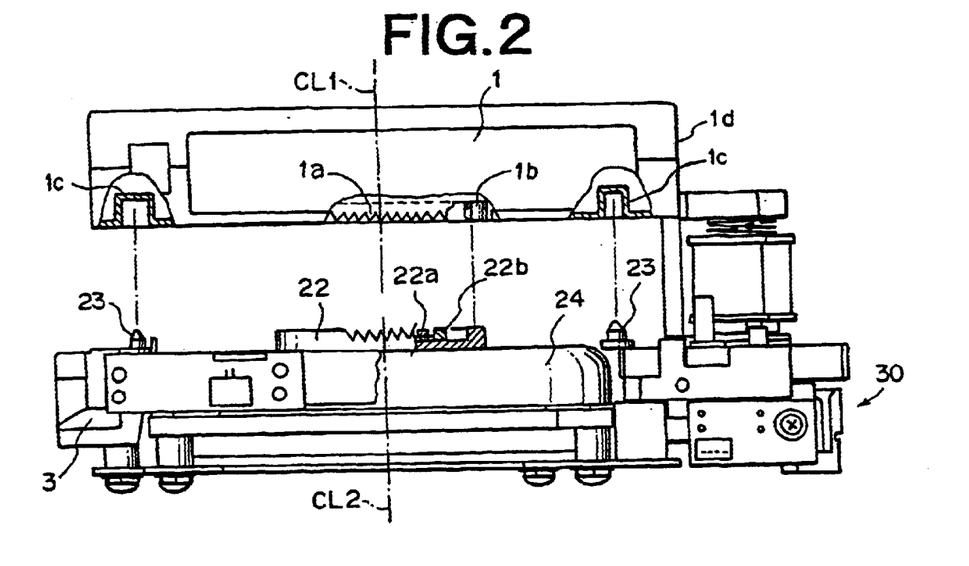
FIG. 2 is a partially cross-sectional exploded front view showing the relationship between a drive device and a cartridge in the cartridge engaging mechanism according to the present invention.
Figure 3:
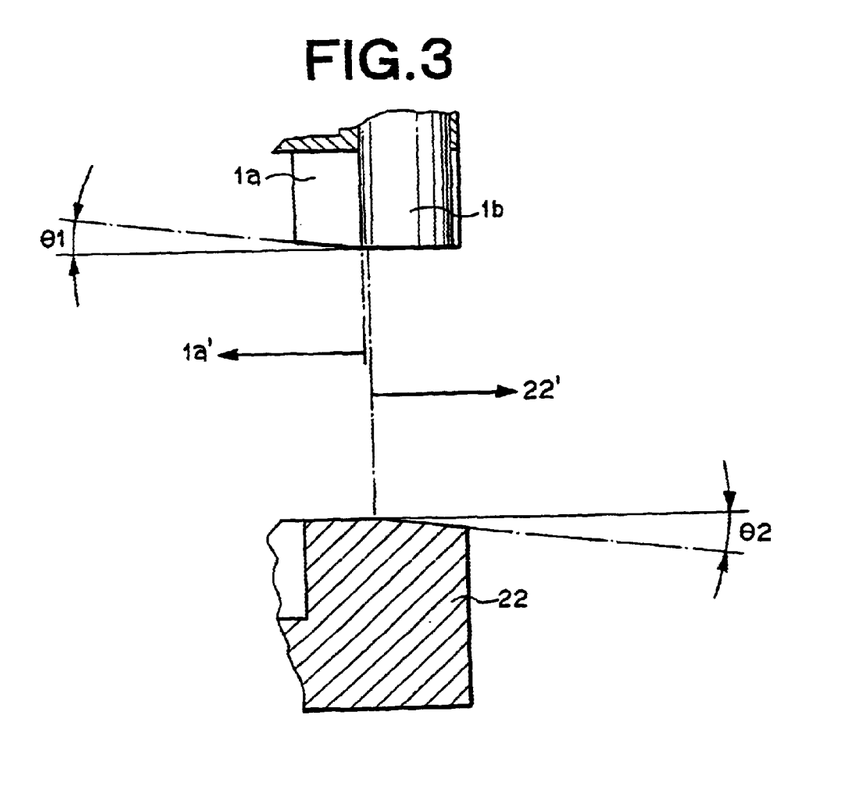
FIG. 3 is a partially enlarged view showing the relationship between the drive device and the cartridge in the cartridge engaging mechanism according to the present invention.

FIG. 2 is a partially cross-sectional exploded front view showing the relationship between the drive device 30 and the cartridge 1, and FIG. 3 is a partially enlarged view of the FIG. 2. A reel motor 24 is secured to the deck base 3 of the drive device 30. A drive gear 22 is connected to the rotating shaft of the reel motor 24, and the rotational center CL2 of the drive gear extends in the up-and-down direction. The drive gear 22 is equipped with a magnet 22a and a yoke 22b which constitute urging means for urging the cartridge gear 1a of the cartridge 1 toward the drive gear 22. Plural support pins 23 for positioning the case 1d of the cartridge 1 are provided to the deck base 3 so as to project upwardly. The support pins 23 are designed so that the upper end portion of each support pin 23 has a substantially conical shape.

Figure 4:
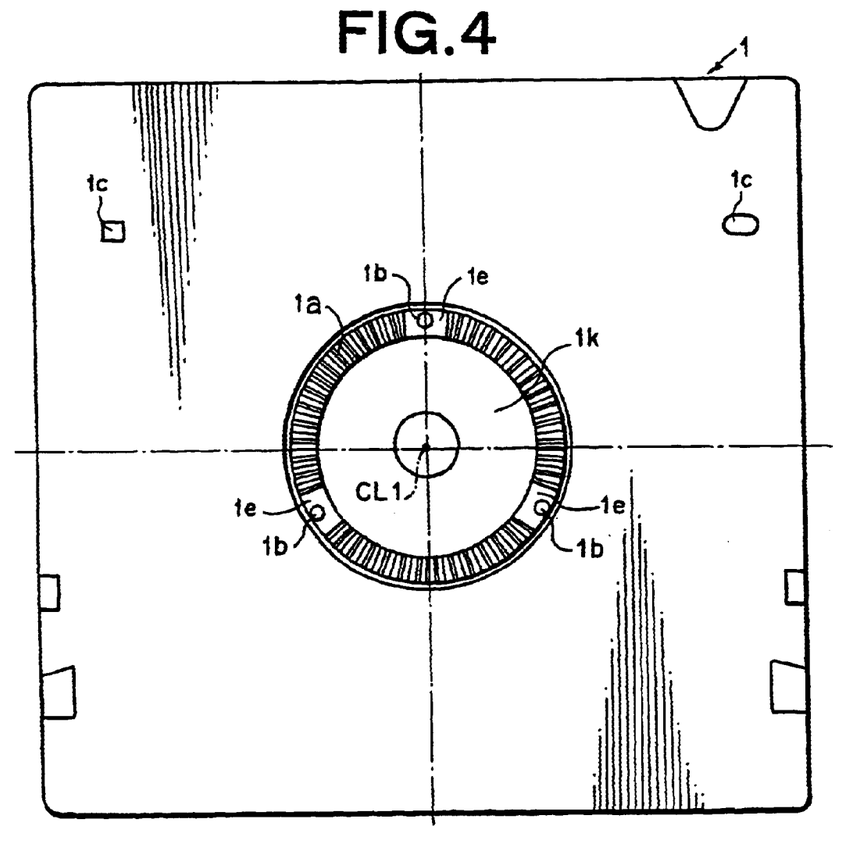
FIG. 4 is a bottom view showing the cartridge in the cartridge engaging mechanism according to the present invention.
Figure 5:
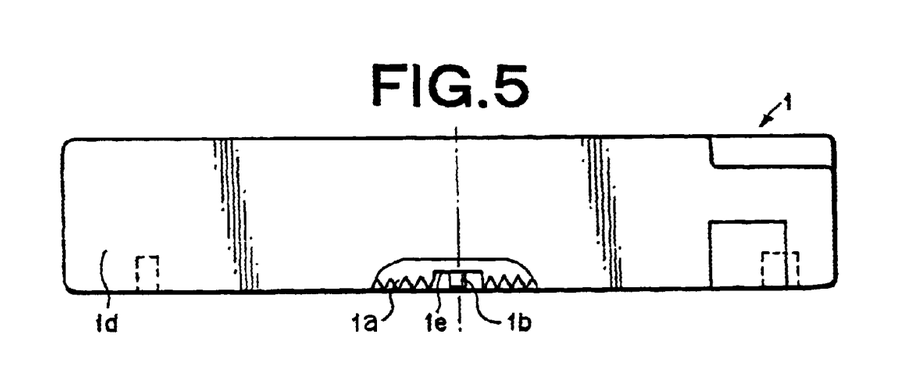
FIG. 5 is a partially cross-sectional front view showing the cartridge in the cartridge engaging mechanism according to the present invention.
Figure 6:
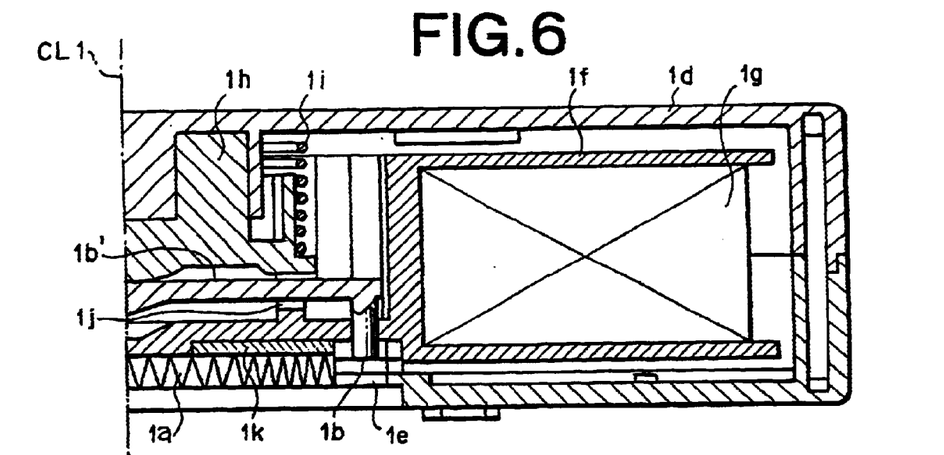
FIG. 6 is a partially cross-sectional view showing the cartridge in the cartridge engaging mechanism according to the present invention.

FIG. 4 is a bottom diagram showing the cartridge 1, and FIGS. 5 and 6 are partially cross-sectional front view and partially cross-sectional view thereof. As shown in FIGS. 2 to 6, the cartridge 1 has the case 1d, a reel 1f disposed in the case so as to be rotatable around the up-and-down direction, and a magnetic tape 1g wound around the reel. The case 1d has a circular opening formed at the center of the lower plate portion thereof, and a cartridge gear 1a is exposed to the outside from the opening. Positioning holes 1c in which the support pins 23 are respectively fit are formed at the positions corresponding to the respective support pins 23.

The cartridge gear 1a is equipped at the lower side of the center portion of the reel 1f, and the rotational center CL1 thereof extends in the up-and-down direction. The face of the cartridge gear 1a is formed to be annular in the circumferential direction around the rotational center CL1 as shown in FIG. 4. The face of the drive gear 22 is likewise formed to be annular in the circumferential direction around the rotational center CL2. The cartridge gear 1a is shaped so as to be engageable with the drive gear 22.

The cartridge gear 1a is equipped with three lock pads 1b disposed at an equal angular interval in the circumferential direction around the rotational center CL1. As shown in FIG. 6, the three lock pads 1b extend upwardly while penetrating through the cartridge gear 1a, and intercommunicate with a common base plate portion 1b' in the case 1d. The shape of the base plate portion 1b' in plan is a substantially triangular shape in which the three lock pads 1b are located substantially at the apexes.

Further, a lock member 1h is secured to the lower side of the center of the upper plate portion of the case 1d while it is slidable in the up-and-down direction and prevented from being rotated around the up-and-down direction. The lock member 1h is pressed downwardly by a coil spring 1i, and the center portion of the lower portion thereof abuts against the base plate portion 1b' of the lock pads. Accordingly, the lock pads 1b are urged downwardly. Further, first latch gears 1j arranged in an annular shape around the rotational center CL1 are formed at the upper surface side of the cartridge gear 1a, and second latch gears arranged arcuately around the rotational center CL1 in an area other than the area corresponding to the triangular shape of the lock pad base plate portion 1b' are formed at the outer peripheral portion of the lower surface of the lock member 1h in connection with the first latch gears 1j. Further, the cartridge gear 1a is equipped with an iron plate 1k serving as a magnetic member constituting the above urging means together with the magnet 22a and the yoke 22b of the drive gear 22, which is located at the position corresponding to the magnet 22a and the yoke 22b.

FIGS. 2 and 5 show a state that the lock pads 1b are downwardly pressed by the coil spring 1i and located at such an advance position that it is projected from the gear face. On the other hand, FIG. 6 shows a state that through the engagement with the drive gear 22 the lock pads 1b are pressed upwardly against the urging force of the coil spring 1i and located at a retract position. Since the lock member 1h is upwardly pressed at the retract position, the engagement between the first and second latch gears are released (that is, the brake is released), so that the reel 1f is allowed to be rotated. When the reel is rotated, the lock pads 1b and the cartridge gear 1a are integrally rotated, and the center portion of the upper surface of the lock pad base plate portion 1b' is relatively rotated to the lock member 1h while brought into point contact with the center portion of the lower portion of the lock member 1h. When the engagement with the drive gear 22 is released, the lock member 1h and the lock pads 1b are downwardly moved by the urging force of the coil spring 1i, and finally the first and second latch gears are engaged with each other, so that the brake is applied. The brake is applied to only the rotation in one rotational direction corresponding to the reel-out direction of the magnetic tape 1g from the reel 1f, and it is never applied to the rotation in the opposite rotational direction.

In an area in the neighborhood of the lock pad, the cartridge gear 1a is provided with non-tooth portions 1e which each lack three teeth of the cartridge gear 1a and thus has a flat surface.

In this embodiment, as shown in FIG. 3, the cartridge gear 1a is designed in such a tapered shape having a first inclination angle θ1 that the tooth tops of the cartridge gear 1a are lowered in height as they approach to the inner peripheral edge. On the other hand, the drive gear 22 is designed in such a tapered shape having a second inclination angle θ2 that the tooth tops of the drive gear 22 are lowered in height as they approach to the outer peripheral edge. Here, the second inclination angle θ2 is smaller than the first inclination angle θ1.

The tapered shape of the drive gear 22 is formed in an area which extends outwardly from the radially-innermost position (indicated by an arrow 22') of the drive gear at which the lock pads 1b abut against the drive gear 22 under the state that the drive gear 22 and the cartridge gear 1a are in proper engagement with each other. Accordingly, the drive gear 22 is designed so that in the area shown by the arrow 22' the width of the flat portion of each tooth top (the dimension in the circumferential direction around the rotational center CL2) is gradually increased in the direction from the radially-innermost position to the outer peripheral edge. On the other hand, the tapered shape of the cartridge gear 1a is formed in an area which extends inwardly from the innermost position of the lock pads 1b in the radial direction (indicated by an arrow 1a').

Next, the operation and action of the cartridge engaging mechanism according to this embodiment will be described with reference to FIGS. 7 and 8 in addition to FIGS. 1 to 6.

Figure 7:
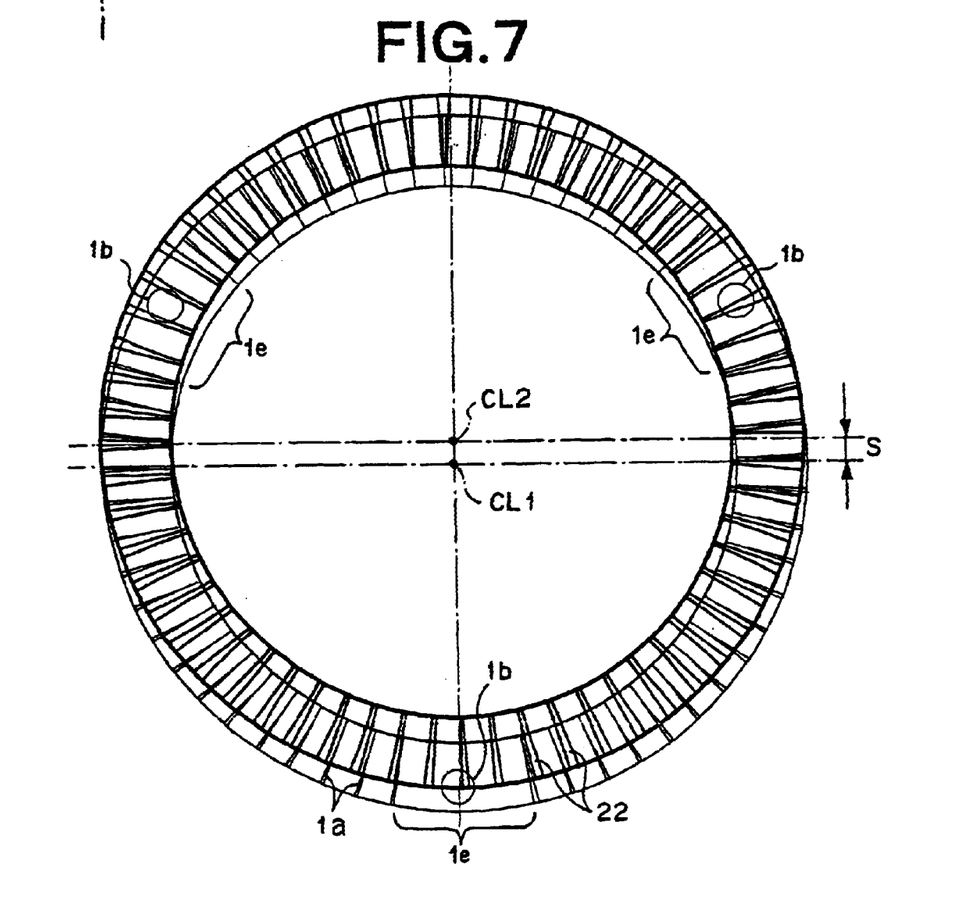
FIG. 7 is a schematic plan view showing a positionally displaced state of a cartridge gear from a drive gear in the cartridge engaging mechanism according to the present invention.
Figure 8:
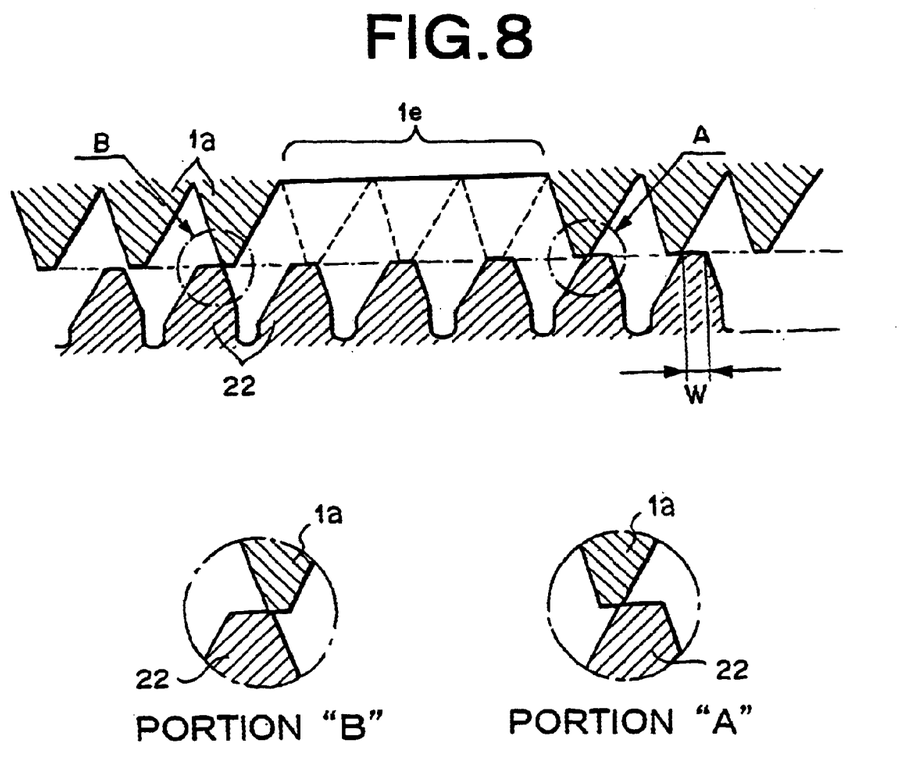
FIG. 8 is a cross-sectional view in the circumferential direction at the outermost peripheral position of the drive gear in the neighborhood of the position corresponding to a lock pad in the cartridge engaging mechanism according to the present invention.

FIG. 7 is a schematic plan view showing a positionally displaced state of the cartridge gear 1a to the drive gear 22 which may occur when the cartridge 1 is loaded in the drive device 30. Under the positionally displaced state shown in FIG. 7, the displacement between the gear rotational centers CL1 and CL2 is equal to S, and the positional displacement direction of the cartridge gear 1a with respect to the drive gear 22 is coincident with the direction of one lock pad 1b relative to the rotational center CL1 of the cartridge gear 1a. FIG. 8 is a cross-sectional view in the circumferential direction at the outermost peripheral position of the drive gear 22 in the neighborhood of the position corresponding to the lock pad 1b concerned in the above case. As shown in FIG. 8, even when there occurs an inclination of the shaft direction of the cartridge gear 1a from the shaft direction of the drive gear 22, the tooth tops located in the vicinity of both sides of the non-tooth portion 1e of the cartridge gear 1a never enter the space between the adjacent teeth of the drive gear 22.

The first reason for this is as follows. Since the drive gear 22 is designed in the tapered shape having the second inclination angle θ2 in which the tooth tops are lower in height toward the outer peripheral edge thereof, the width W of each tooth-top flat portion is largest at the outermost peripheral portion, and thus even when the displacement S between the rotational centers CL1 and CL2 of the gears is greatly large (for example, even when the displacement S is 1.7 time as large as that of the cartridge engaging mechanism described with reference to FIGS. 12 to 14), the tooth tops of the cartridge gear 1a abut against the tooth-top flat portions of the drive gear 22. Further, the second reason for this is that the tooth tops of the cartridge gear 1a first abut against the outermost peripheral portion of the drive gear 22 because θ2<θ1.

Therefore, even when the positioning precision of the cartridge case 1d to the drive device 30 and the positional precision of the cartridge gear 1a to the cartridge case 1d are not so high, the tooth-top flat portions of the drive gear 22 have large margins for receiving the tooth tops of the cartridge gear 1a, so that the relative rotation between both the gears is possible and a proper engagement can be performed after the relative rotation of a slight angle (for example, several degrees). When this engagement is made, the iron plate 1k equipped to the cartridge gear 1a is attracted to the magnet 22a and the yoke 22b of the drive gear 22.

Through this proper engagement, the lock pad 1b is pressed upwardly by the tooth tops of the drive gear 22. Under this state, the inner edges of the lock pads 1b nearest to the rotational center CL1 abut against the portions located at the highest position (the innermost position in the radial direction which corresponds to the start point of the arrow 22') of the teeth of the drive gear 22, so that the movement stroke of the lock pads 1b can be secured even when the height of the teeth is low at the outermost peripheral position of the drive gear 22. This engagement releases the brake of the reel lock mechanism of the cartridge 1 as described above.

In the positioning operation of the cartridge gear 1a and the cartridge reel 1f to the drive gear 22 as described above, the support pin 23 is fitted into the positioning hole 1c of the cartridge case 1d at the same time, thereby completing the positioning of the cartridge case 1d to the drive device 30. Accordingly, the amount of the upward and downward movement when the engagement of the cartridge is made can be reduced, and thus the drive device 30 can be designed in compact size.

Next, the cartridge loading mechanism portion constituting the drive device 30 according to this embodiment will be described with reference to FIGS. 9 and 10. The loading mechanism portion feeds the cartridge 1 inserted in the direction of an arrow X in FIGS. 9 and 10 and moves it to a predetermined position at which the magnetic tape in the cartridge 1 can be reeled out and rewound. In addition, the loading mechanism portion feeds the cartridge 1 containing the rewound magnetic tape from the predetermined position in the direction of an arrow Y and moves it to a predetermined position at which the cartridge 1 can be discharged in the direction of the arrow Y.

A loader guide plate 4 which is positionally fixed with respect to the deck base 3 is disposed in the loading mechanism portion, a loader drive plate 5 is disposed inside the loader guide plate 4 and a cartridge tray 2 is disposed inside the loader drive plate 5. FIG. 10 is a partially exploded perspective view showing the relationship of the loader guide plate 4, the loader drive plate 5 and the cartridge tray 2.

Figure 10:
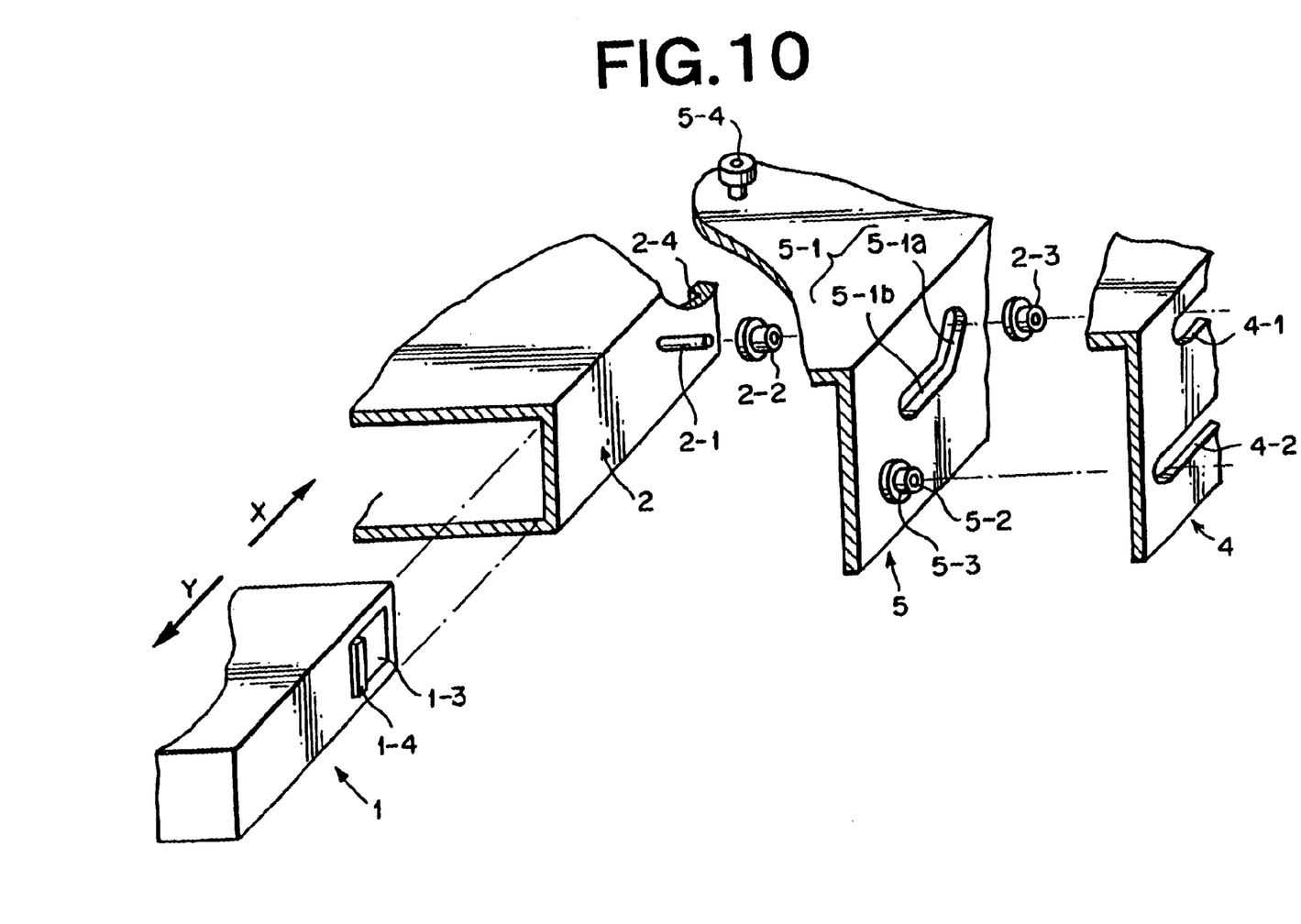
FIG. 10 is partially exploded perspective view showing the loading mechanism portion of the drive device in the cartridge engaging mechanism according to the present invention.

As shown in FIG. 10, the cartridge 1 is inserted into the cartridge tray 2 in the direction of X. A pin 2-1 is formed on one side surface of the cartridge tray 2 so as to project outwardly from the side surface of the cartridge tray 2. A loader drive groove 5-1 is formed in the side surface of the loader drive plate 5. The loader drive groove 5-1 comprises a slant portion 5-1a which is designed to be higher at the front portion thereof and lower at the rear portion thereof with respect to the X direction, and a horizontal portion 5-1b connected to the Y-direction end of the slant portion 5-1a. Loader guide grooves 4-1, 4-2 are formed in the side surface of the loader guide plate 4. The pin 2-1 extends through the loader drive groove 5-1 and the loader guide groove 4-1, and a roller 2-2 which is movable in and along the loader drive groove 5-1 and a roller 2-3 which is movable in and along the loader guide groove 4-1 are rotatably secured to the pin 2-1. These rollers 2-2, 2-3 are equipped with flanges for the spacing between the side surface of the cartridge tray 2 and the side surface of the loader drive plate 5 and the spacing between the side surface of the loader drive plate 5 and the side surface of the loader guide plate 4, respectively. A pin 5-2 is provided to the side surface of the loader drive plate 5 so as to project outwardly from the side surface, and a roller 5-3 which is movable in and along the loader guide groove 4-2 is rotatably secured to the pin 5-2.

The relationship of the loader guide plate 4, the loader drive plate 5 and the cartridge tray 2 is shown in FIG. 10 with respect to one side surface side, and the same construction is provided at the other side surface side. However, in addition to the pin 2-1, a pin 2-1' similar to the pin 2-1 is provided to the other side surface of the cartridge tray 2 so as to project outwardly as shown in FIG. 9. In connection with the pin 2-1', a loader drive groove 5-1' similar to the loader drive groove 5-1 is formed in the other side surface of the loader drive plate 5 in addition to the loader drive groove 5-1.

The pin 2-1' extends through the loader drive groove 5-1' and the loader guide groove 4-2, and a roller 2-2' which is movable in and along the loader drive groove 5-1' and a roller 2-3' which is movable in and along the loader guide groove 4-2 are rotatably secured to the pin 2-1' in analogous manner to the case of the pin 2-1. Further, in addition to the pin 5-2, a pin 5-2' is provided to the other side surface of the loader drive plate 5 so as to project outwardly, and a roller 5-3' which is movable in and along the loader guide groove 4-2 is rotatably secured to the pin 5-2' as shown in FIG. 9.

Figure 9:
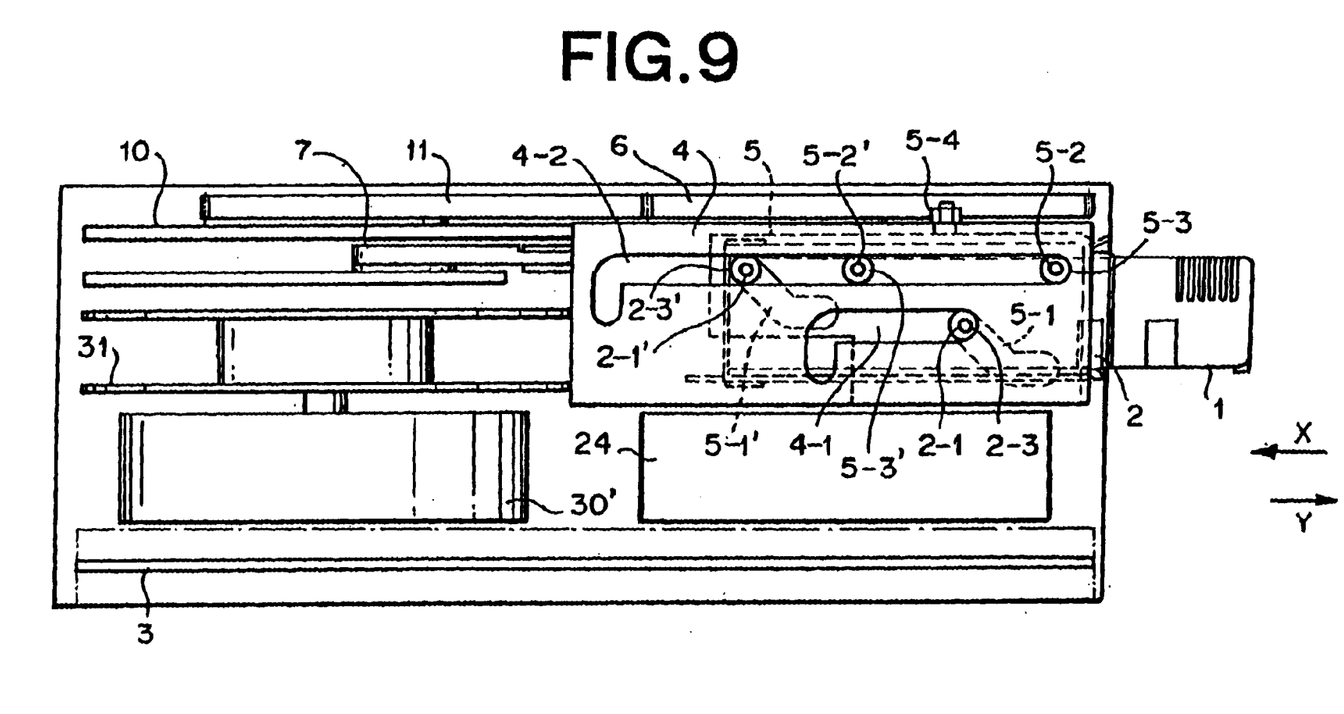
FIG. 9 is a side view showing a loading mechanism portion of the drive device in the cartridge engaging mechanism according to the present invention.

As shown in FIG. 9, each of the loader guide grooves 4-1, 4-2 comprises a horizontal portion extending in the direction of X and a vertical portion extending downwardly substantially in the vertical direction from the X-direction end of the horizontal portion. The shapes of the loader guide grooves 4-1, 4-2 and the positions of the pins 2-1, 2-1' are set so that the rollers 2-3, 2-3' reaches the vertical portions of the loader guide grooves 4-1, 4-2 at the same time.

With this construction, the loader drive plate 5 and the cartridge tray 2 can be supported so as to be movable in the XY direction and the up-and-down direction perpendicular to the XY direction with respect to the loader guide plate 4.

A loader drive roller 5-4 is secured to the top surface of the loader drive plate 5, and the loader drive roller 5-4 extends through a groove formed along the XY direction on the upper surface of the loader guide plate 4 to the upper side of the loader guide plate 4.

As shown in FIG. 10, the cartridge tray 2 is equipped with an engaging member 2-4 at the position where the engaging member 2-4 is engaged with an engaging projection 1-4 provided to the door 1-3 of the cartridge 1. The cartridge door 1-3 is opened through the engagement between the engaging projection 1-4 and the engaging member 2-4 when the cartridge 1 is inserted to a predetermined position of the tray 2.

The cartridge 1 is inserted into the cartridge tray 2 in the direction X manually or by using a proper handling machine and a loader drive gear 6 is rotated around the up-and-down direction by driving means (not shown) to thereby move the loader drive roller 5-4 engaged with a cam groove formed in the loader drive gear in the X direction. In connection with this movement, the cartridge tray 2 is first moved in the X direction together with the cartridge 1, and then moved downwardly to a predetermined position. The downward movement of the cartridge tray 2 starts the engaging operation of the above cartridge engaging mechanism.

In FIG. 9, reference numeral 30' represents a machine reel motor for rotating a machine reel 31, reference numeral 11 represents a threader drive gear having outer teeth which are engaged with the loader drive gear 6, and reference numeral 10 represents a threading cam. The threading cam 10 has a threading cam groove engaged with a pin which is equipped to a threading arm (not shown) fitted in a cam groove formed in the threader drive gear 11. Thereby, by moving the pin of the threading arm along the threading cam groove, the leading edge of the magnetic tape in the cartridge 1 loaded can be drawn out and guided to the machine reel 31 along a predetermined route.

Figure 11:
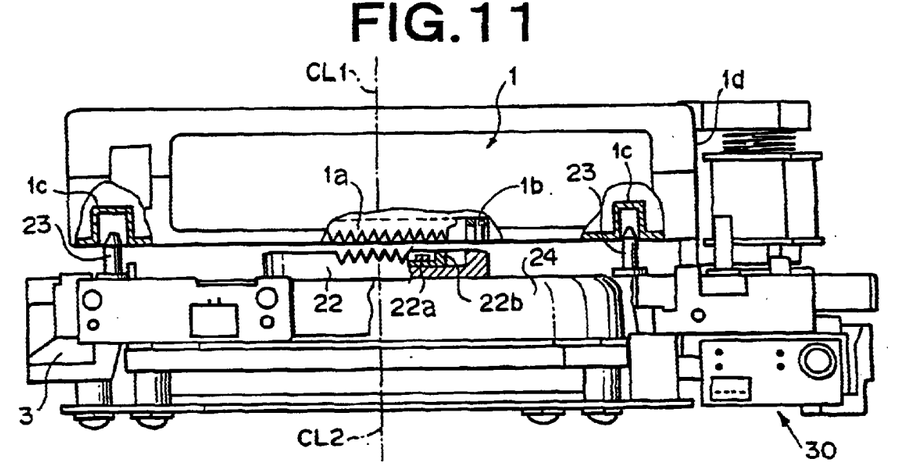
FIG. 11 is a partially cross-sectional exploded front view showing the relationship between the drive device and the cartridge to explain the cartridge engaging mechanism according to the present invention.

FIG. 11 is a partially cross-sectional exploded front view showing the relationship between the drive device and the cartridge to explain another embodiment of the cartridge engaging mechanism according to the present invention. In FIG. 11, the members having the same functions as those of FIG. 2 are represented by the same reference numerals.

This embodiment is different from the embodiment described with reference to FIGS. 1 to 10 in the length of the support pin 23 provided to the drive device 30. That is, the length of the support pin 23 of this embodiment is set to such a sufficient value that it is inserted into the positioning hole 1c before the contact between the cartridge gear 1a and the drive gear 22 is started when the cartridge gear 1a is engaged with the drive gear 22. The depth of the positioning hole 1c may be set to a larger value than that of the embodiment of FIGS. 1 to 10.

According to this embodiment, the cartridge case 1d is first positioned to the drive device 30 when the cartridge 1 is loaded. Therefore, when the cartridge gear 1a is engaged with the drive gear 22, it is sufficient to correct only the positional displacement amount of the cartridge gear with respect to the cartridge case 1d. Therefore, the tolerance level of the positional displacement of the cartridge gear 1a with respect to the cartridge case 1d can be further enhanced, and thus the cost can be further reduced.

In the above embodiments, the magnetic tape cartridge is used as the tape cartridge, however, the same action and effect can be also achieved when the present invention is applied to tape cartridges other than the magnetic tape cartridge, for example, an optical tape cartridge or other types of tape cartridges.

What is claimed is:

1. A cartridge engaging mechanism for engaging a plane-type cartridge gear secured to a reel of a tape cartridge loaded in a tape drive device with a plate-type drive gear connected to a reel motor of the tape drive device, characterized in that said cartridge gear has a tapered shape having a first inclination angle that is lower in height as the tooth tops thereof approach to the innermost peripheral edge, and said drive gear has a tapered shape having a second inclination angle that is lower in height as the tooth tops thereof approach the outermost peripheral edge, the second inclination angle being set to be smaller than the first inclination angle.

2. The cartridge engaging mechanism as claimed in claim 1, wherein each of a face of said cartridge gear and a face of said drive gear is formed in an annular shape in a peripheral direction around a rotational center thereof.

3. The cartridge engaging mechanism as claimed in claim 1, wherein said cartridge is equipped with a reel lock mechanism for preventing rotation of said reel with respect to a case of said cartridge, and said reel lock mechanism has a lock pad that is reciprocatively movable between an advance position and a retract position at a part of the face of said cartridge gear and urged toward the advance position.

4. The cartridge engaging mechanism as claimed in claim 3, wherein the tapered shape of said drive gear is formed in an area which extends outwardly from the radially-innermost position of said drive gear at which said lock pad abuts against said drive gear under the state that said drive gear and said cartridge gear are in proper engagement with each other.

5. The cartridge engaging mechanism as claimed in claim 4, wherein a width of a flat portion of each of the tooth tops of said drive gear is gradually larger in the outward direction from the radially-innermost position of said drive gear at which said lock pad abuts against said drive gear under the state that said drive gear and said cartridge gear are in proper engagement with each other.

6. The cartridge engaging mechanism as claimed in claim 3, wherein the tapered shape of said cartridge gear is formed in an area which extends inwardly from the innermost position of said lock pad in the radial direction of said cartridge gear.

7. The cartridge engaging mechanism as claimed in claim 3, wherein said cartridge gear has a non-tooth portion having no tooth in an area in the neighborhood of said lock pad.

8. The cartridge engaging mechanism as claimed in claim 1, further comprising urging means for urging said cartridge gear toward said drive gear.

9. The cartridge engaging mechanism as claimed in claim 8, wherein said urging means comprises a magnet equipped to said drive gear and a magnetic member equipped to said cartridge gear.

10. The cartridge engaging mechanism as claimed in claim 1, wherein a case of said tape cartridge is equipped with a positioning hole, and said tape drive device is equipped with a support pin which is inserted into said positioning hole when said cartridge gear is engaged with said drive gear to position said case to said tape drive device.

11. The cartridge engaging mechanism as claimed in claim 10, wherein said support pin has such a sufficient length as to be inserted into said positioning hole before contact between said cartridge gear and said drive gear is started when said cartridge gear is engaged with the drive gear.

* * * * *